A. B. CADMAN.
END GATE LOCK.
APPLICATION FILED FEB. 26, 1916.

1,190,238.

Patented July 4, 1916.

Witness:
Harry P. White

Inventor:
Addi Benjamin Cadman
By Miller, Chindahl & Parker
Atty's.

UNITED STATES PATENT OFFICE.

ADDI BENJAMIN CADMAN, OF BELOIT, WISCONSIN, ASSIGNOR TO WARNER MANUFACTURING COMPANY, OF BELOIT, WISCONSIN, A CORPORATION OF ILLINOIS.

END-GATE LOCK.

1,190,238.                    Specification of Letters Patent.        Patented July 4, 1916.

Application filed February 26, 1916. Serial No. 80,582.

*To all whom it may concern:*

Be it known that I, ADDI BENJAMIN CADMAN, a citizen of the United States, residing at Beloit, in the county of Rock and State of Wisconsin, have invented certain new and useful Improvements in End-Gate Locks, of which the following is a specification.

This invention has reference to an improved means for locking an end-gate to the body of a vehicle, and the object of the invention is to provide such a locking means which will not only securely hold the end-gate against accidental displacement, but will rigidly clamp the end-gate to the body so as to prevent all rattling noise which might be caused by relative movement therebetween.

A further aim is to provide a locking means which will be very secure and at the same time very easy and convenient to operate.

In the accompanying drawings I have illustrated my invention as applied to an automobile trailer since it is especially advantageous in such a vehicle.

Figure 1:
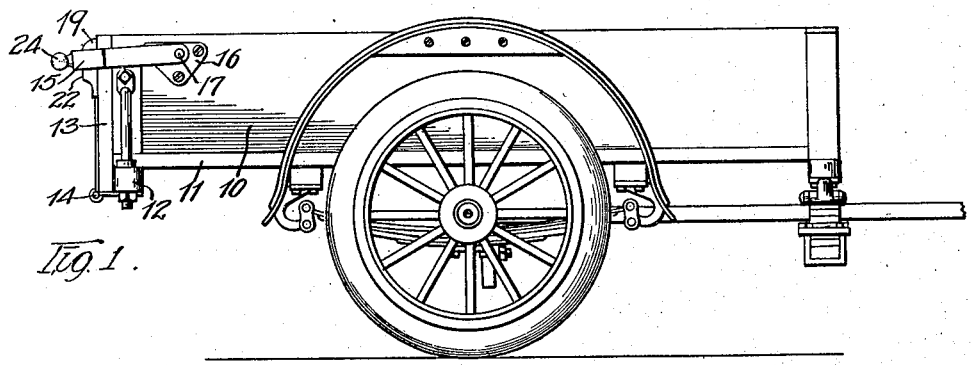
Figure 2:
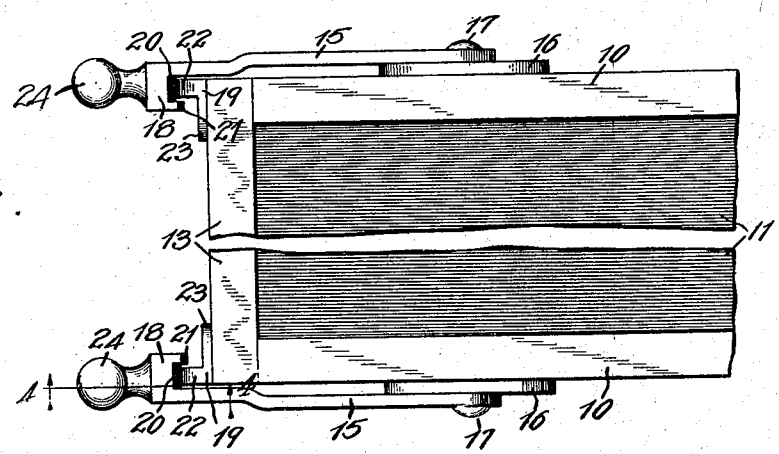
Figure 3:
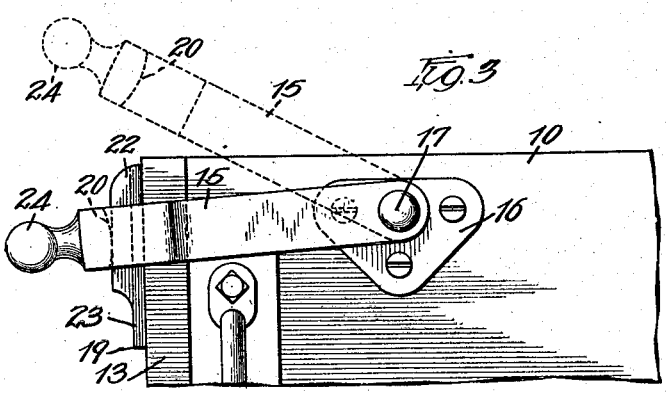
Figure 4:
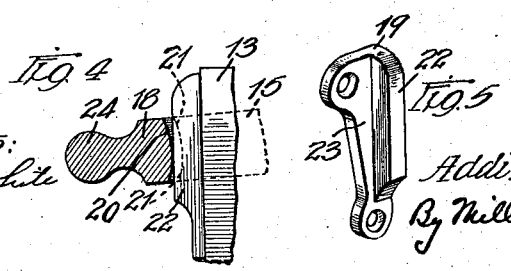
Figure 5:

Figure 1 represents a side elevation of a trailer equipped with an end-gate locking means embodying my invention. Fig. 2 is a fragmental plan view on an enlarged scale with parts broken out. Fig. 3 is an enlarged fragmental elevation illustrating the lock. Fig. 4 is a detail section in the plane of line 4—4 of Fig. 2, and Fig. 5 is a perspective view of one of the lock members which are mounted on the end-gate.

The body of the vehicle may be of any common or preferred construction, being herein shown as comprising sides 10, a bottom 11 and a cross-beam 12 secured beneath the bottom at the rear end of the body. This cross-beam in the present instance provides the support to which the end-gate 13 is secured by suitable hinges 14 along its lower edge, the end-gate being arranged to abut against the rear ends of the sides 10 and bottom 11. This particular manner of mounting the end-gate, however, is not essential to my invention.

The means for locking the end-gate in closed position comprises similar devices at opposite ends thereof and it will be only necessary to describe those at one end of the end-gate or at one side of the vehicle body. An arm 15 is pivoted at one end to the side wall 10 of the body, preferably by means of an attaching plate 16 which is screwed to the wall 10 and which carries a pivot stud 17 supporting the arm 15. The opposite or free end of the arm is provided with an inwardly offset shoulder 18 to coöperate with a member 19 mounted on the rear face of the end-gate preferably near the upper outer corner thereof. While the exact shape of the parts is not essential, in the preferred form thereof the shoulder is grooved as at 20 and the bottom wall of the groove is of arcuate shape, the groove providing a guard flange 21. The member 19 preferably comprises a rib portion 22 having an attaching flange 23 apertured to receive screws for securing the member to the end-gate. Beyond the shoulder 18 the arm 15 is preferably provided with a rounded head 24 which forms a convenient handle to be grasped by the fingers in operating the arm.

When the end-gate is in closed position and the arm 15 is swung downwardly into the position shown in the drawings, the shoulder 18 frictionally binds against the rib 22, or in other words, exerts a camming force against said rib, so that by downward pressure on the arm the end-gate may be very rigidly clamped to the body of the vehicle so as to effectually prevent rattling of the parts. The frictional grip of the arm and the weight thereof which tends to hold the arm in operative position, are sufficient to insure against accidental disengagement of the arm. When it is desired to open the end-gate, the locking means may be very quickly disengaged by simply lifting the arms out of engagement with the members 19 and, if desired, the arms may be swung to the opposite sides of their pivot studs 17, until the shoulders 18 rest upon the upper edge of the side walls 10. The provision of curved faces on the shoulders 18 lends security to the gripping capacity thereof, even after the parts of the locking means and the mounting for the end-gate become worn and somewhat loosened. The guard flanges 21 act to prevent the shoulders from slipping laterally out of engagement with the ribs 22. The mounting of the lever 15 on the pivot studs 17 is preferably sufficiently firm to prevent such lateral disengagement of the shoulders 18, but the guards 21 give additional security and may be called into play if the parts become worn and loosened as above described.

It will be apparent that the locking means may be modified in some of its details without sacrificing the essential characteristics and advantages thereof and I therefore do not limit myself to the precise structure disclosed except as recited in the appended claims.

I claim as my invention:

1. A vehicle having, in combination, a body having side walls, an end-gate hinged at its lower edge to the body, two members having outstanding ribs secured to the rear face of the end-gate near the upper outer corners thereof, two arms secured to the outer faces of the body side walls by means of attaching plates having pivot studs on which the arms are mounted, said arms having inwardly offset shoulders adjacent to their free ends, and having heads beyond said shoulders adapted to be grasped by the fingers, said shoulders having curved faces arranged to abut against the rear edges of said ribs on the end-gate, and the shoulders having guard flanges at their inner sides to prevent disengagement from said ribs, whereby when said arms are swung downwardly the shoulders frictionally grip said ribs and bind the end-gate rigidly to the body of the vehicle.

2. A vehicle having, in combination, a body, an end-gate closing one end of the body and hinged at its lower edge thereto, a pair of arms each pivoted at one end to the outer face of one of the sides of the body and having near its opposite end an inwardly offset shoulder, and two ribbed members secured to the rear face of the end-gate near the ends thereof, said arms being adapted to be swung on their pivots to carry said shoulders into frictional binding engagement with the ribs of said members for rigidly clamping the end-gate to the vehicle body.

3. A vehicle having, in combination, a body, an end-gate, two members secured to the rear face of the end-gate near the ends of the latter, and two arms each pivoted at one end to the outer face of one of the sides of the body forwardly of the end-gate, each arm having at its free end an inwardly offset shoulder arranged to overlie one of the said members on the end-gate, the arms being arranged to be swung in a vertical plane to carry said shoulders into and out of engagement with said members, said arms when swung downwardly lying alongside the ends of the end-gate and projecting rearwardly from the latter and said shoulders then exerting a camming action upon said members to force the end-gate forwardly and frictionally bind the same in closed position.

In testimony whereof, I hereunto set my hand.

ADDI BENJAMIN CADMAN.

In the presence of—
T. R. HARPER,
IDA I. WARD.

Copies of this patent may be obtained for five cents each, by addressing the "Commissioner of Patents, Washington, D. C."